United States Patent [19]
Vogelsang et al.

[11] Patent Number: 5,743,232
[45] Date of Patent: Apr. 28, 1998

[54] DRIVE UNIT WITH AN ENGINE AND A RETARDER

[75] Inventors: Klaus Vogelsang, Crailsheim; Peter Rose, Ilshofen; Helmut Ott; Peter Heilinger, both of Crailsheim, all of Germany

[73] Assignee: Voith Turbo GmbH & Co. KG, Heidenheim, Germany

[21] Appl. No.: 847,563

[22] Filed: Apr. 24, 1997

[30] Foreign Application Priority Data

Apr. 25, 1996 [DE] Germany ............... 196 16 426.5

[51] Int. Cl.$^6$ ..................................... F02D 39/02
[52] U.S. Cl. ............................................. 123/320
[58] Field of Search ............... 123/320, 41.13, 123/319, 142.5 R; 128/292, 296

[56] References Cited

U.S. PATENT DOCUMENTS

| | | | |
|---|---|---|---|
| 2,750,009 | 6/1956 | Pohl | 188/90 |
| 3,051,273 | 8/1962 | Cordiano et al. | 188/90 |
| 3,650,358 | 3/1972 | Bessiere | 188/296 |
| 3,720,372 | 3/1973 | Jacobs | 237/12.3 |
| 3,860,097 | 1/1975 | Braschler et al. | 188/296 |
| 3,919,844 | 11/1975 | Elderton | 60/330 |
| 4,169,414 | 10/1979 | Muller | 105/61 |
| 4,175,647 | 11/1979 | Hanke | 188/274 |
| 4,200,002 | 4/1980 | Takahashi | 74/530 |
| 4,411,340 | 10/1983 | Brosius et al. | 188/296 |
| 4,458,792 | 7/1984 | Thomas et al. | 188/296 |
| 4,474,270 | 10/1984 | Vogelsang | 188/296 |
| 4,538,553 | 9/1985 | Kurz et al. | 123/41.13 |
| 4,744,443 | 5/1988 | Brosius | 188/292 |
| 4,773,513 | 9/1988 | Herrmann et al. | 188/276 |
| 4,836,341 | 6/1989 | Hall, III | 188/290 |
| 4,908,905 | 3/1990 | Kanno et al. | 16/82 |
| 4,922,872 | 5/1990 | Nogami et al. | 123/319 |
| 5,193,654 | 3/1993 | Vogelsang | 188/296 |
| 5,251,588 | 10/1993 | Tsuji et al. | 123/142.5 R |
| 5,255,733 | 10/1993 | King | 123/142.5 R |
| 5,333,707 | 8/1994 | Kaneda | 188/296 |

FOREIGN PATENT DOCUMENTS

| | | | |
|---|---|---|---|
| 0 707 140 | 4/1996 | European Pat. Off. | 123/320 |
| 2 383 053 | 10/1978 | France | 123/320 |
| 1 946 167 | 5/1970 | Germany | 123/320 |
| 2 150 115 | 4/1973 | Germany . | |
| 2462058 | 4/1976 | Germany | 123/320 |
| 33 01 560 | 4/1984 | Germany | 123/320 |
| 37 13 580 | 11/1988 | Germany | 123/320 |
| 44 08 349 | 10/1994 | Germany | 123/320 |
| 1007421 | 10/1965 | United Kingdom | 123/320 |
| 1 464 372 | 2/1977 | United Kingdom . | |

OTHER PUBLICATIONS

European Search Report of European Application 97 10 4907.7, Applicant: Voith Turbo GmbH & Co. KG.
Abstract of German Publication No. 2 150 115 obtained from Derwent World Patent Index.
Abstract of French Publication No. 2 383 053 obtained from Derwent World Patent Index.
Abstract of European Publication No. 0 707 140 obtained from Derwent World Patent Index.
Abstract of German Publication No. 37 13 580 obtained from Derwent World Patent Index.
European Search Report of counterpart European Application No. 96 10 6593.5, Applicant, Voith Turbo GmbH.

*Primary Examiner*—Raymond A. Nelli
*Attorney, Agent, or Firm*—Marshall, O'Toole, Gerstein, Murray & Borun

[57] ABSTRACT

A drive unit includes a hydrodynamic retarder having a rotor paddle wheel, a stator paddle wheel, and a housing surrounding the rotor and stator wheels. The unit has a coolant cycle system, through which a coolant flows, the coolant also being a working medium of the retarder. The drive unit further includes a working medium container for the coolant and a pipe having a valve. The pipe is disposed between the retarder and the working medium container. The unit also has a coolant feed line to the retarder.

3 Claims, 1 Drawing Sheet

1

DRIVE UNIT WITH AN ENGINE AND A RETARDER

BACKGROUND OF THE INVENTION

1. Field of the Invention

The invention relates to drive units and in particular to such units having an engine, a retarder and a pump.

2. Description of Related Technology

Drive units having an engine, a retarder and a pump are known in the art. For example, such a drive unit is disclosed in DE 37 13 580 which discloses a retarder for circulating the coolant of a vehicle cooling unit which is disposed in the coolant circulation, both in normal traction operation as well as during retarder operation (i.e., a "water-pump retarder"). The retarder disclosed in DE 37 13 580 is controlled by a suitable valve arrangement in such a way that in case of need, the retarder also can perform braking work. During the "pumping" operation, the power uptake should be as low as possible, while the power uptake should be as high as possible during the retarder "braking" operation. The technical requirements are thus very contradictory. As a result, the "pumping" operation does not operate effectively enough as too much power is taken up (i.e., absorbed).

On the other hand, if the two functions of "pumping" and "braking" are separated structurally, by providing a separate pump in addition to a retarder, then, although the retarder and the pump can be designed in such a way that the functions will be fulfilled optimally, such a system has a high space requirement. This is disadvantageous because the space in vehicles is very limited, especially at the particular location where the pump and the retarder would need to be placed.

For the sake of completeness, the following publications also are disclosed herein:

The retarder disclosed in U.S. Pat. No. 3,720,372 is integrated with the driving engine, permanently attached to the crankshaft, and coolant of the cooling unit continuously flows through the retarder. The rotor of the retarder serves as a circulating pump instead of a special coolant pump. The purpose of this arrangement is to heat the coolant by the retarder in order to heat the passenger compartment. A control system disposed on the retarder serves the purpose of passing or distributing the coolant as a function of its temperature in a bypass line through the radiator.

A retarder also is disclosed in DE 33 01 560 (corresponds to U.S. Pat. No. 4,538,553) which is connected through a switchable coupling to the crankshaft of a driving engine and to the driving wheels of a vehicle. However, the task of the retarder is not the uptake and conversion of the high kinetic braking energy of the vehicle into heat. The retarder is operated exclusively as a heater, whereby the heating output is controlled with consideration of the available drive power. The coolant of the engine also is the operating fluid of the retarder.

A retarder disclosed in DE-AS 1 946 167 (corresponds to U.S. Pat. No. 3,650,358) is connected directly to the crankshaft of an internal combustion engine, the coolant of which also serves as an operating fluid for the retarder. An advantage of this mode of operation is that the heat produced evolves directly in the coolant introduced to the radiator and the heat exchanger between two fluids can be omitted.

EP 707 140 discloses a drive unit with an engine and a hydrodynamic retarder. In order to transport the coolant, a pump impeller is provided which is disposed axially to the rotor paddle wheel of the retarder.

The retarder systems described herein that are known in the art each have a relatively complicated structure and are expensive to produce. Also, in the known drive units, a power loss occurs in the retarder during the non-braking operation. The power loss occurs because the retarder is filled with air which circulates during this operation. In addition, residues of the working medium may be present in the working circuit which may lead to a significant heating of the circuit. Secondary circulation also may develop during the non-braking operation. These occurrences also may cause loss of power.

SUMMARY OF THE INVENTION

It is an object of the invention to overcome one or more of the problems described above. It also is an object of the invention is to provide a drive unit of the type described above in which the power loss is largely avoided and the unit can be kept at a low thermal level. In addition, the development of secondary circulation should be largely avoided.

A drive unit according to the invention includes a hydrodynamic retarder having a rotor paddle wheel, a stator paddle wheel, and a housing surrounding the rotor and stator wheels. The unit includes a coolant cycle system for an internal combustion engine, the coolant for this coolant cycle also being a working medium of the retarder. The drive unit further includes a working medium container for the coolant and a pipe having a valve. The pipe is disposed between the retarder and the working medium container. The unit also has a coolant feed line to the retarder.

Other objects and advantages of the invention will be apparent to those skilled in the art from the following detailed description taken in conjunction with the drawing and the appended claims.

DETAILED DESCRIPTION OF THE INVENTION

Figure 1:
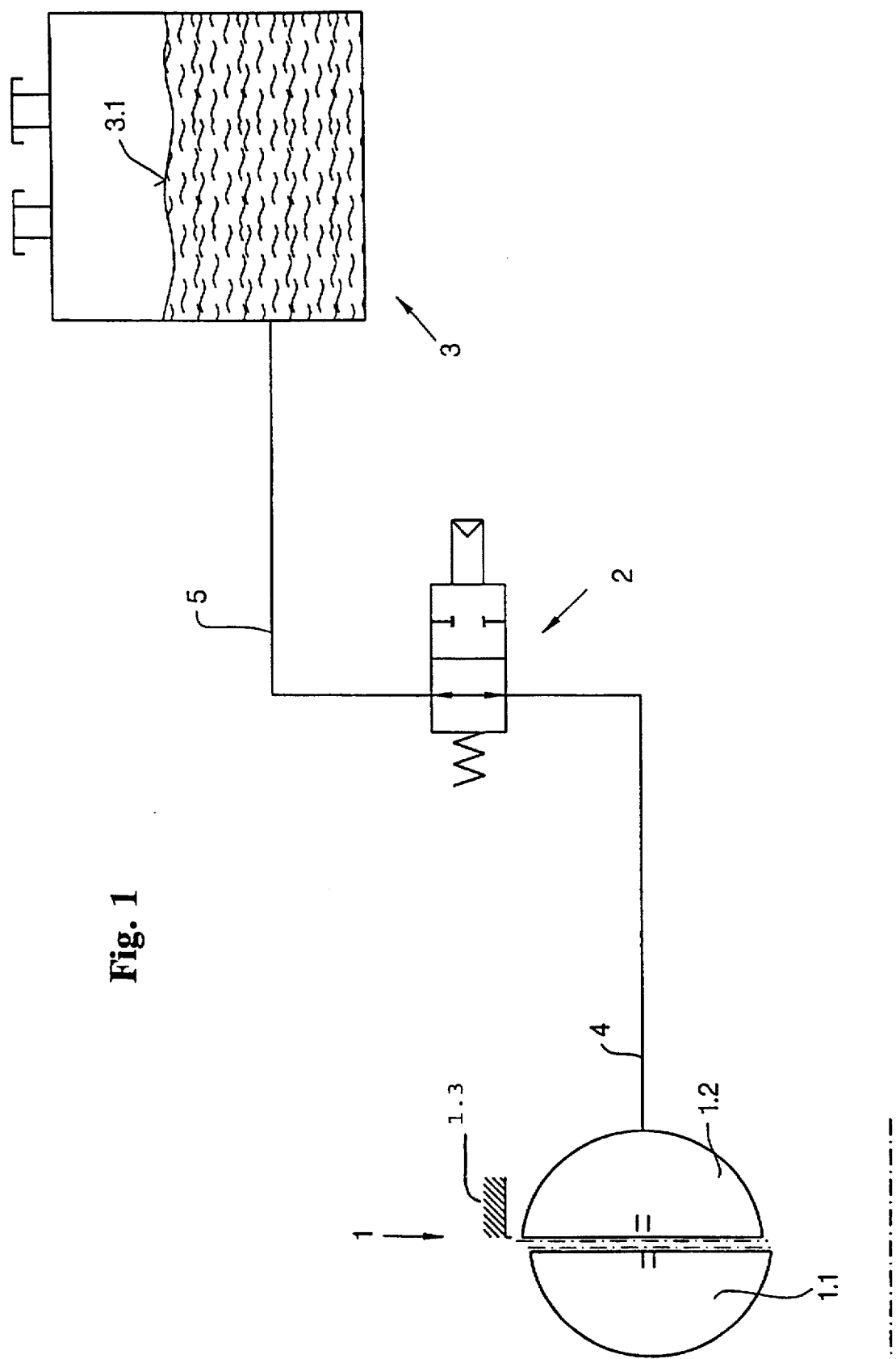
FIG. 1 is a schematic view of a drive unit according to the invention.

In a drive unit according to the invention, a valve is disposed in a pipe which connects a retarder to a container which holds the coolant for the internal combustion engine. This coolant also is the working medium of the retarder. The valve is closed during the braking operation of the retarder, so that no side circuits can develop. This valve is open during non-braking operation.

By introducing a coolant to the retarder and corresponding removal of the coolant during non-braking operation of the retarder, the ventilation heat is removed from the retarder. The otherwise unavoidable loss-braking-momentum is minimized in all operating states of the non-braking operation of the retarder, during the so-called pumping operation, and the retarder is thermally controlled. On the other hand, during the braking operation of the retarder, transverse flow and secondary circulation are avoided.

With reference to the drawings, FIG. 1 is a schematic representation of an embodiment of a drive unit/braking system according to the invention having a retarder 1, a valve 2, and a working medium container 3 shown filled with a working medium up to a level 3.1.

The retarder 1 has a rotor paddle wheel 1.1 and a stator paddle wheel 1.2 which together form one working chamber. The wheels are surrounded and supported by a housing 1.3, shown schematically.

The drive unit aggregates 1, 2, and 3 are connected to one another with the following pipes:

A pipe 4 extends between the retarder 1 and the valve 2, and is connected to the stator paddle wheel 1.2. A pipe 5 extends between the valve 2 and the working medium container 3. The pipe 5 has an opening disposed below the level 3.1 of the working medium (i.e., coolant) in the working medium container 3. The valve 2 may be activated with the hydraulic pressure present in the drive unit system.

In order to keep the retarder at a low thermal level during the pumping operation and to keep the power loss low at the same time, according to the invention, a defined amount of the working medium from the container 3 is introduced to the retarder 1 as a cooling medium in order to take up heat at the retarder 1 and then to carry this heat via the working medium to the container 3. Care must be taken to keep the resistances in the pipe system as low as possible in order to ensure loss-free removal of the working medium which serves as a coolant. If the flow resistances or the amount of coolant introduced are too high, these would have an adverse effect on the losses in the retarder.

In order to avoid development of secondary circulation during the braking operation, the valve 2.0 must be closed. In the embodiment shown in FIG. 1, this is accomplished by a 2/2-way valve with the aid of a pneumatic control line.

Other valve embodiments according to the invention are conceivable, for example, an automatically operated hydraulic 2/2-way valve or an electrically controlled 2/2-way valve may be used. However, these solutions are more expensive.

It also may be expedient to provide a check valve adapted to the system, in order to prevent back flow of the working medium into the retarder during the retarder pumping operation.

The foregoing detailed description is given for clearness of understanding only, and no unnecessary limitations should be understood therefrom, as modifications within the scope of the invention will be apparent to those skilled in the art.

We claim:

1. A drive unit comprising:

a) a hydrodynamic retarder having a rotor paddle wheel, a stator paddle wheel, and a housing surrounding said wheels;

b) a coolant cycle system, through which a coolant flows for an internal combustion engine, the coolant also being a working medium of the retarder;

c) a working medium container for the coolant;

d) a pipe having a valve, the pipe disposed between the retarder and the working medium container; and e) a coolant feed line to the retarder.

2. The drive unit of claim 1 wherein the valve is a 2/2-way valve.

3. The drive unit of claim 1 wherein the valve is activated with the hydraulic pressure present in the system.

* * * * *